United States Patent [19]

Otamendi-Busto

[11] Patent Number: 4,936,253
[45] Date of Patent: Jun. 26, 1990

[54] MARINE FISH FARM
[76] Inventor: Santiago Otamendi-Busto, Zumalacarregui 27, 2008 San Sebastian Guipuzcoa, Spain
[21] Appl. No.: 266,175
[22] Filed: Nov. 2, 1988
[30] Foreign Application Priority Data
  Nov. 2, 1987 [ES] Spain ................................ 8703125
[51] Int. Cl.$^5$ ........................................... A01K 61/00
[52] U.S. Cl. ...................................................... 119/3
[58] Field of Search .................................. 119/2, 3, 4
[56] References Cited

U.S. PATENT DOCUMENTS

| | | | |
|---|---|---|---|
| 3,698,359 | 10/1972 | Fremont | 119/3 |
| 4,084,543 | 4/1978 | Pequegnat | 119/3 |
| 4,189,379 | 2/1980 | Finley | 119/3 X |
| 4,205,625 | 6/1980 | Muller-Feuga | 119/3 X |
| 4,703,719 | 11/1987 | Mori | 119/3 |
| 4,716,854 | 1/1988 | Bourdon | 119/3 |
| 4,747,369 | 5/1988 | Götmalm | 119/3 |
| 4,766,846 | 8/1988 | Lavoie | 119/4 |

FOREIGN PATENT DOCUMENTS
  587915 1/1978 U.S.S.R. ................................ 119/3

Primary Examiner—Cary E. Stone
Assistant Examiner—R. Thomas Price
Attorney, Agent, or Firm—Helfgott & Karas

[57] ABSTRACT

A marine fish farm includes a submersible cultivation cage having a rigid cylindrical body having annular rings spaced from each other within the cylindrical body and connected to each other by beams and crosspieces, an elongated body attached to the upper end of the cage and containing ballast tanks, and a column extending upwardly from the elongated body to the level above the sea surface and terminating with a tower, in which maintenance and personnel facilities are located. The depth of the cultivation cage is defined by the length of the column and adjusted by the ballast tanks so that the cage surrounded by a netting is always below the level of influence of sea waves.

6 Claims, 2 Drawing Sheets

MARINE FISH FARM

BACKGROUND OF THE INVENTION

The present invention relates to a marine fish farm for cultivating fish in an intensive system to obtain an optimum productivity and a maximum simplification in cleaning of the netting, derived from the possibility of locating the fish farm at the depth and marine area.

The methods in the field of aquaculture which are commonly called "marine farms" have, to date, been employing three systems, namely, extensive, semi-intensive and intensive.

The extensive system consists in enclosing the fish, crustaceans and mollusks in ponds, marshes, yards or large enclosures, where the fish, at a very low density, must obtain food on their own, i.e., from their environment and when they reach the commercial stage they are fished for their commercialization. Obviously, productivity in this system is low since cultivations must bear loads of approximately 100/200 kg. of fish per hectare per year.

The semi-extensive system is similar to the intensive system, with the sole difference that it provides more food for the fish, affording cultivation loads which increase to 2000/5000 kg. of fish per hectare per year.

Finally, the intensive system consists in enclosing a large group of fish in a small pond made of cement, plastic, or any other suitable material, where fish are submitted to large streams of water, which require feeding, etc., and where fish may be cultivated with high density. Such system have cultivation loads of approximately 300,000 kg of fish per hectare per year.

Thus, it is obvious that the intensive system prevails with respect to the two other systems described hereinabove.

In countries with a longer marine aquaculture tradition, such as Japan and Norway, small floating cages have been installed in more sheltered areas of bays, fiords, lagoons, etc. However, the deficiency of oxygen, high temperature fluctuations, concentration of residues, outcrop of seaweed, etc. have gradually caused more open and deeper areas to be sought. Furthermore, the cages have been designed to withstand the dynamic efforts of areas with scarce shelter to be used.

The trend observed in the countries, where aquaculture is more developed, consists in increasingly using large cages, placing them away from sheltered areas in the areas which are more exposed to the dynamic effects of the waves. This is obviously due to the fact that sheltered areas have smaller flows of water, are shallower, and the decay of fiords affects the cultivation system, depriving it of oxygen and poisoning it with the production of hydrogen suflide; temperature fluctuations are very high, with the consequent risk of diseases. In such countries it may be observed that year after year fish farms are moved to deeper areas, but due to the many fiords and internal seas, as well as to the slow development of aquaculture, such sheltered areas essentially meet the current needs.

Thus, the aforementioned problems, plus the fact that fish live in the sea and must obviously be reared in the sea, show that this is the most ideal location for fish farms, and the deeper locations are the better ones.

Fish farms are known, which includes large floating platforms from which hang and are submerged in water one or many cages which contain the fish being cultivated. The cages are made from netting. However, this method, albeit solving the aforementioned problems and relating to installations in sheltered areas, gives rise to new and by no means insignificant problems.

Specifically the waves to which the fish farm will be permanently submitted, require that the fish farm same to be substantially oversized. Attention is to be called in this sense to the fact that, in deep water, waves can reach heights of 22 m. and periods of 16 seconds whereby the fish farms must have the structural strength but they also have the limitation as regards their dimensions.

On the other hand, these floating installations imply that fish grow in a surface area where there are very considerable temperature fluctuations, both as regards time and as regards the sea area in which requires that the fish farm be located in a specific place, which is most suitable for the optimum range of temperatures of a specific species of fish. And furthermore, an effect called thermocline which consists in that the surface water layer is heated as a result of solar radiation, which gives rise to a strip of approximately 30 m. of warm water, essentially takes place in the summer, fish swim in the upper area of the thermocline. In the autumn, and due to the action of the waves, the water tends to be uniform, the temperature tending to decrease towards that at the sea floor. The water is consequently formed of different layers or strata down to 50/70 m., and from this depth the water temperature tends to be uniform. These changes in the water temperature are very harmful fish since it depletes their defenses vis-a-vis diseases.

Finally, the surface layer of the water, particularly due to solar heating, affords the most suitable conditions for the growth of seaweed, which tend to block the netting which surrounding the fish, wherefore the frequency and intensity of cleaning operations is very important, for, because in an intensive cultivation, it is necessary that the netting be kept perfectly clean in order that the water inside the fish farm be constantly renewed, to ensure a constant suitable level of oxygenation.

SUMMARY OF THE INVENTION

It is an object of the present invention to provide a marine fish farm designed to cultivate fish using an intensive system and in deepwater areas, in which the three previously discussed problems would be resolved, and which farm could not be affected by the effects of waves, allowing for an optimum control of the temperature and a minimum growth of seaweed on the enclosureg netting or meshes thereof.

More specifically, the fish farm of the invention has such structural features that the cultivation cage may be submerged below the level of action of the waves, whereas the auxilliary facilities for personnel, are located above the sealevel. The two parts of the marine fish farm, i.e., the submerged cultivation cage and the maintenance facilities, are connected to each other through a column or tube with a small diameter which affords a practically non-existent floating area and which is the only element submitted to the effects of waves, whereby the stability of the fish farm of the invention is optimal.

In accordance with a preferred embodiment, the cultivation cage comprises a cylinder of a diameter of 25 m. and a length of 50 m. (which is practically impossible to keep on the surface with waves of 22 m.). The cage is installed at a depth of 25-50 m., clearly escaping the action of the waves. The maintenance facilities are located above sea level thus also escaping the action of the waves. On the other hand, and as is known, the temperature and proportion of oxygen dissolved in water, vary depending on the depth. The fish farm of the invention not only foresees that the cultivation cage will be submerged but also that its depth may be adjusted at will, for which purpose the cage is provided with adjustable ballast, similar to those used in the adjustment of the depth of a submarine. The ballast tanks allow a vertical displacement of the cultivation cage a distant of approximately 25 m., whereby the position of the cage may vary between a maximum depth of 5-30 m. and a minimum depth of 30 m.. The temperature is controlled by means of three sensors located in the upper part of the cage, in the center and in the lower part of the cage, wherefore the temperature and the oxygen dissolved in a 25 m. water column may be determined automatically at all times and the most suitable option may be chosen for each case.

Finally, this submerged position, considerably remote from the surface, gives rise to a minimization of the obstruction in the netting due to the growth of seaweed, since, as has been previously mentioned, these essentially grow at a surface level, where heating is maximum. The cultivation cage of the fish farm of the invention may be placed at depths of $-30/-55$ m., at which depths there is practically no solar heating, wherefore growth of seaweed is practically non-existent.

Nevertheless, the netting of such huge cultivation cage may attract some species of mollusks, poliquetus, balanus, etc, as well as some minute quantities of seaweed which must be remove in order to keep a maximum flow of water. In this sense, it has been foreseen that the cultivation cage of the invention be provided with a rotary spraying apparatus, to apply water under pressure of 200 kg. per $cm^2$ to automatically clean the the cylinder cage.

It has further been forseen that, in order to fully eliminate the above problem, the surrounding netting may also be eliminated and the the structure of the cage be submitted to electric currents to produce discharges on the fish, causing same to remain at some distance from an enveloping structure. This last solution however, increases the cost of the maintenance of the fish farm, due to the consumption of energy.

In order to complete the description and to assist a better understanding of the characteristics of the invention, a set of drawings is attached as an integral part thereof of the specification.

DETAILED DESCRIPTION OF THE PREFERRED EMBODIMENT OF THE INVENTION

Figure 1:
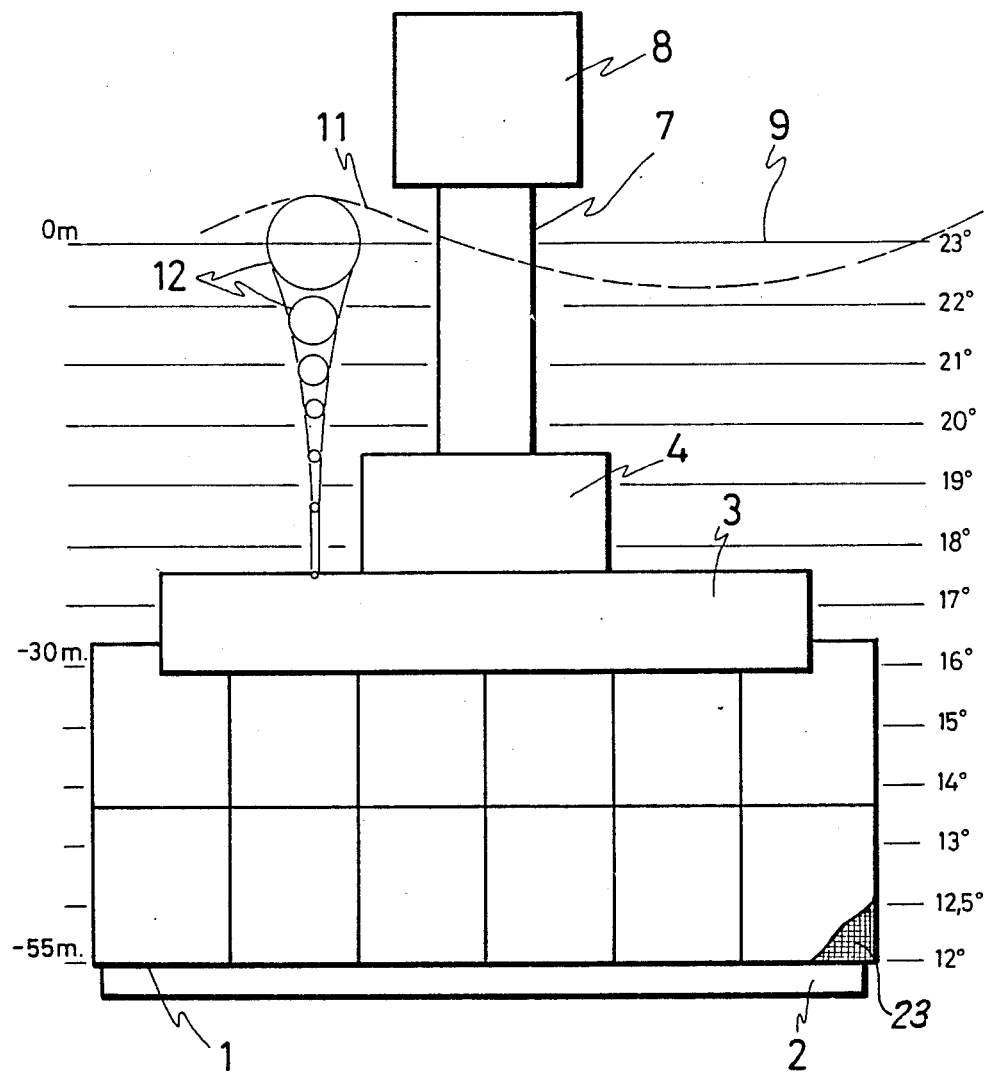
FIG. 1 is a side elevational diagrammatic view of a marine fish farm in accordance with the present invention and also showing the table of temperatures corresponding to the different depths in the water, as well as the cross-section of an imaginary wave and its energy development in the mass of water.

Referring now to the drawing in greater detail it may be seen that the fish farm of the invention is comprised of cultivation cage having a cylindrical structure 1 having annular elements 20 rigidly connected to each other by means of beams 21 and crosspieces 22 and designed, to support a netting 23 which entirely surrounds the cage and which is shown in FIG. 1 of the drawings. The cage which forms a large cylindrical container which preferably has a diameter of 25 m. and a length of 50 m. and should be placed in the water with its axis in a horizontal position.

The cage structure 1, which is moreover reinforced by means of a lower keel 2, receives on its upper area a prismatic container 3 likewise arranged on one of the cage generatrixes. Container 3 essentially affects the length of the cage 1. A plurality of ballast tanks are positioned in container 3 which, as aforesaid, allow the depth of the cultivation cage to be adjusted. A shorter body 4 is positioned on container 3, which is also divided into sections by means of a series of intermediate partitions or covers 5. Body 4 is likewise provided with conveniently located ballast tanks 6.

A hollow column 7 projects upwardly from the center of body 4, column 7 is long enough for a tower 8 provided on its uper end to be positioned above the water level 9. Tower 8 is likewise provided with many partitions or covers 10, wherein are established the services for the maintenance personnel of the fish farm, such as bedrooms, toilets, kitchen-dining room, office, etc., as well as the installations for the breeding of larvae and young fish. The tanks for reproductive animals may be produced in column 2. In the lower prismatic bodies of the cylindrical structure constituting the cultivation cage itself, may be installed the food stores, the means for measuring out the food, and also chambers for larvae and young fish, together with the mentioned ballast tanks and with the activating means of the latter.

Nevertheless irrespective of the ballast means, the rest of the divisions of the upper elements may be variable and may be effected in accordance with any constructive policy which may be deemed convenient for each case.

This specific structure of the fish farm, and as may be observed from FIG. 1, allows the cultivation cage 1 to be placed outside the scope of influence of the waves 11, where the large diameter waves of the orbits 12 (FIG. 1) described by the water particles when the wave passes by and consequently the effect of the waves on said cage 1, are practically non-existent, and only the waves of smaller diameters may affect the column 7 which has a small diameter and a very small floating while the waves do not affect the upper tower 8.

Figures 2, 3:
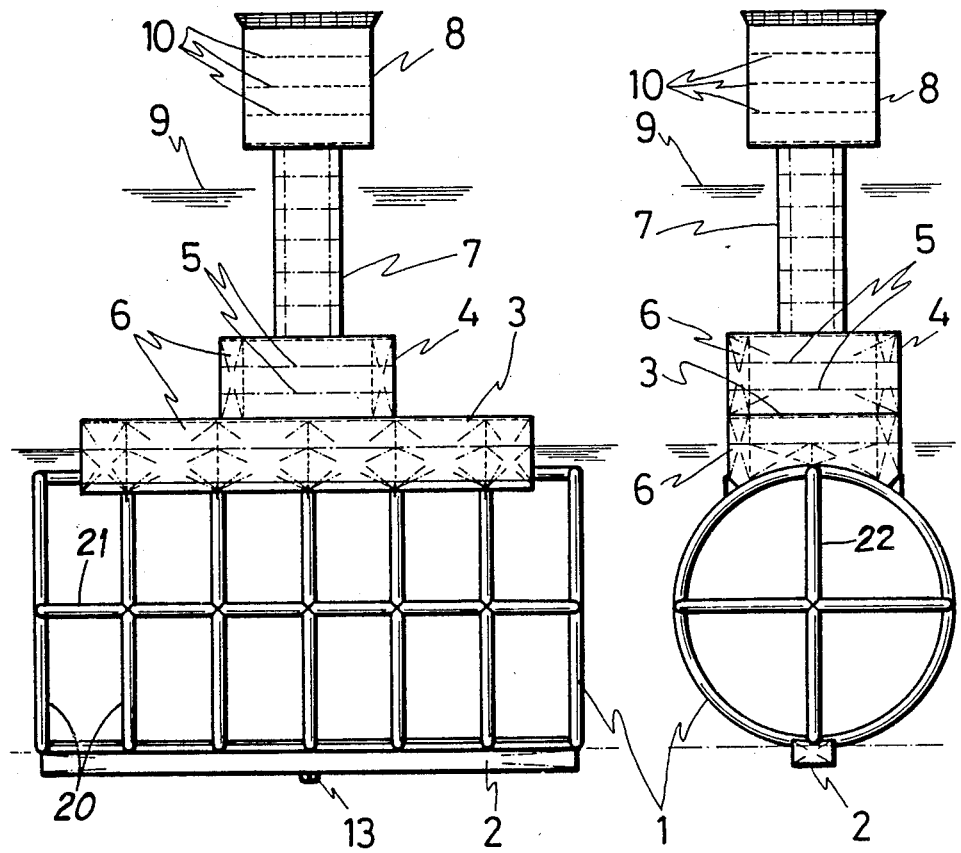
FIG. 2 is a side elevational view of a specific embodiment of the fish farm.
FIG. 3 is a front view of the assembly shown in FIG. 2.

In accordance with the structure of the invention the fish farm may be installed in any deepsea area deemed convenient. The fish farm may be fixed to the sea floor by any suitable means, such as cables which are fixed to the anchorage 13 (FIG. 2) provided in the keel 2. The cultivation cage 1 is positioned outside the scope of influence of both the waves and the solar heating and at a suitable level for temperature in the cage to be constant, by means of the actuation of the ballast tanks 6 elevate or lower the assembly. The three essential effects previously foreseen thus are obtained, namely, a relatively simple structure which does not suffer the pressure of the waves, optional temperature conditions for the growth of the fish and optional flow conditions for the water within the cultivation cage with a minimum need to clean the enclosure net, in view of the nearly total absence of solar heating.

I claim:

1. Marine fish farm for deep sea intensive cultivations, comprising a submersible cultivation cage including a cylindrical rigid structure, a plurality of annular rings provided in said structure and spaced from each other and rigidly connected to each other by beams and crosspieces, and an enclosure netting placed over said cylindrical rigid structure; a lower keel provided at a bottom of said rigid structure; an elongated body fixed to an upper generatrix of said rigid structure; a plurality of ballast tanks positioned in said elongated body for adjusting at will the depth of the fish farm as a whole; a hollow column upwardly projecting from said elongated body and being provided at an upper end thereof with a tower containing personal facilities and maintenance facilities of the fish farm, said tower being located above sea level, said column being of the length sufficient to always maintain said tower above the water whereas said ballast tanks allow for a vertical displacement of the cultivation cage between the depths of the range between 25 and 50 m so as to maintain said cultivation cage and said tower outside the scope of influence of sea waves.

2. The fish farm according to claim 1, wherein said cylindrical structure is about 50 m long and about 25 m in diameter.

3. The fish farm according to claim 1, wherein said elongated body is prismatic.

4. The fish farm according to claim 1, wherein said column has a small floating area.

5. The fish farm according to claim 1, wherein a further hollow body containing ballast tanks is provided between said elongated body and said column, whereby the depth of said cultivation cage is adjusted by said ballast tanks so that said cage may be positionally adjusted within the sea water in accordance with the most suitable temperature level for the fish to grow and far from the effect of solar heating which increases growth of seaweed which may block the netting.

6. The fish farm according to claim 1, wherein said maintenance facilities include larvae and young fish chambers which can additionally be positioned in said column and said elongated body, and tanks for reproductive animals, food stores and other accessories.

* * * * *